(12) United States Patent
Lat et al.

(10) Patent No.: US 6,918,222 B2
(45) Date of Patent: Jul. 19, 2005

(54) FASTENER FOR SPACING OBJECT FROM SUBSTRATE

(75) Inventors: Geronimo E. Lat, Ivanhoe, IL (US); Joseph Righter, Jr., Rolling Meadows, IL (US); Francis D. O'Connor, Skokie, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/658,251

(22) Filed: Sep. 9, 2003

(65) Prior Publication Data

US 2005/0053448 A1 Mar. 10, 2005

(51) Int. Cl.[7] .............................................. E04C 5/16
(52) U.S. Cl. ........................... 52/680; 52/361; 52/362; 52/454; 411/470
(58) Field of Search ....................... 411/442, 443, 457, 411/470, 439, 473, 475; 206/340, 345–347; 52/677–682, 52/361–362, 454

(56) References Cited

U.S. PATENT DOCUMENTS

| | | | | |
|---|---|---|---|---|
| 256,488 A | * | 4/1882 | Leonard | 411/470 |
| 312,460 A | * | 2/1885 | Haight | 411/470 |
| 324,126 A | * | 8/1885 | Le Gay | 411/470 |
| 401,343 A | * | 4/1889 | Gildemeyer | 411/470 |
| 717,554 A | * | 1/1903 | Doan | 16/9 |
| 1,087,262 A | * | 2/1914 | Sheppard | 294/86.14 |
| 1,546,522 A | * | 7/1925 | Voight | 52/680 |
| 1,590,003 A | * | 6/1926 | Voight | 52/454 |
| 1,607,954 A | * | 11/1926 | Johnson | 52/680 |
| 1,610,082 A | * | 12/1926 | Francis | 52/680 |
| 1,703,557 A | * | 2/1929 | Sullivan | 52/680 |
| 1,703,560 A | * | 2/1929 | Voight | 52/680 |
| 1,801,400 A | * | 4/1931 | Venzie | 52/289 |
| 1,822,781 A | * | 9/1931 | McSkimming | 52/680 |
| 1,852,868 A | * | 3/1932 | Drake | 52/677 |
| 1,877,274 A | * | 9/1932 | Crowhurst | 52/713 |
| 1,957,467 A | * | 5/1934 | Elmore | 52/680 |
| 1,957,476 A | * | 5/1934 | Sloan | 175/332 |
| 2,034,726 A | * | 3/1936 | Menninger | 52/451 |
| 2,314,481 A | * | 3/1943 | Crooks | 52/718.02 |

(Continued)

OTHER PUBLICATIONS

McMaster Carr Catalogue "Staples" section p. 3136 available online at www.mcmaster.com—Date website last updated for public: Jun. 23, 2003.*
Stanley BOSTITCH website www.bostitch.com—Date website was last updated for public: Jun.23, 2003.*
Metric conversion charts available online at http://www.stainless-nails-brads-staples.com/conversion1.htm Copyright 1998-2000 DWG Software Ltd. Date website was available to public: Oct. 30, 2002, last updated Dec. 23, 2002.*

*Primary Examiner*—Flemming Saether
*Assistant Examiner*—Jeffrey A. Sharp
(74) *Attorney, Agent, or Firm*—Lisa M. Soltis; Mark W. Croll; Donald J. Breh

(57) ABSTRACT

A novel fastener for holding and spacing an object at a predetermined distance from a substrate comprises a bridge portion, a first prong extending in a driving direction from the bridge portion, and a second prong spaced from the first prong and extending generally parallel to the first prong in the driving direction from the bridge portion, wherein the second prong is substantially shorter than the first prong.

14 Claims, 4 Drawing Sheets

U.S. PATENT DOCUMENTS

| | | | |
|---|---|---|---|
| 2,521,019 A | * | 9/1950 | Percoco ................... 411/470 |
| 2,533,062 A | * | 12/1950 | Spink ..................... 411/470 |
| 2,589,491 A | * | 3/1952 | Goodstein ................ 29/432.1 |
| 2,887,004 A | * | 5/1959 | Stewart ................... 411/470 |
| 3,339,265 A | * | 9/1967 | Powers et al. ............ 29/432.1 |
| 3,339,448 A | * | 9/1967 | McKee .................... 411/473 |
| 3,741,068 A | | 6/1973 | Andruskiewicz |
| 4,257,200 A | * | 3/1981 | Hensley et al. .............. 52/4 |
| 5,074,453 A | * | 12/1991 | Tachihara et al. ........ 227/130 |
| 5,484,094 A | | 1/1996 | Gupta |
| 6,237,827 B1 | | 5/2001 | Reckelhoff |
| 6,363,679 B1 | | 4/2002 | Rutherford |
| 6,481,613 B1 | | 11/2002 | Tebo |
| 2003/0192935 A1 | | 10/2003 | Lat et al. |

* cited by examiner

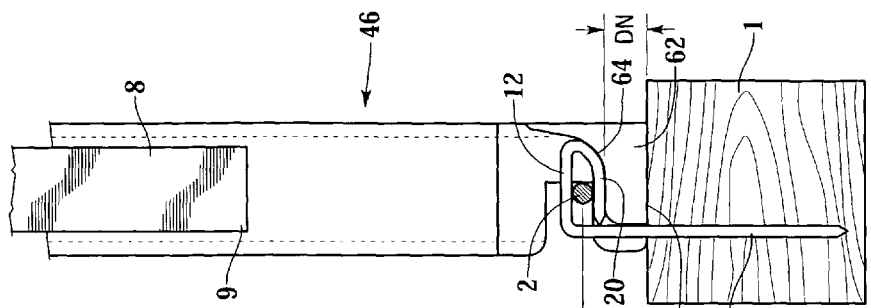
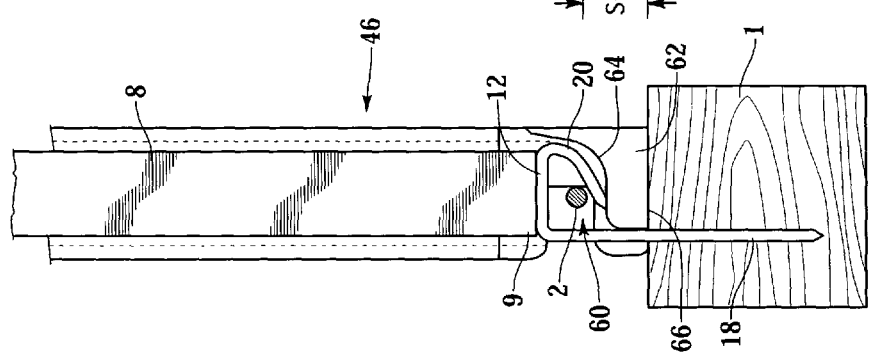
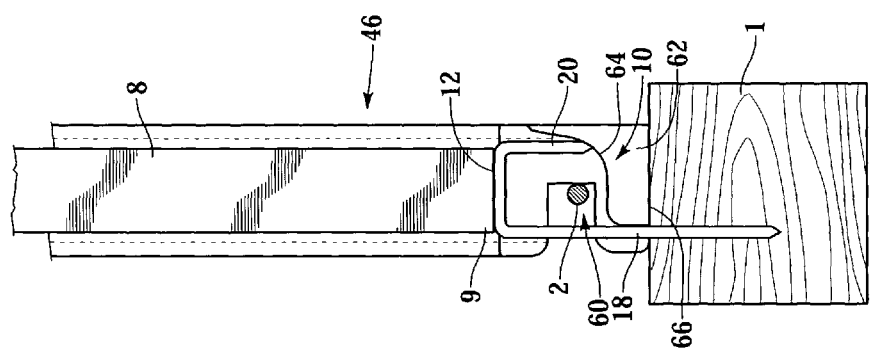
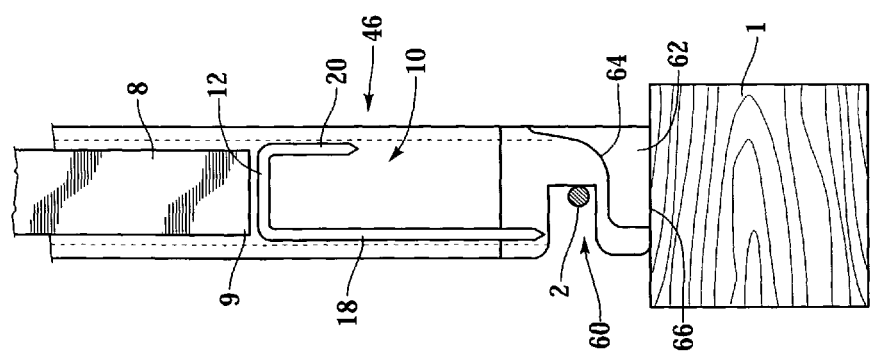

FASTENER FOR SPACING OBJECT FROM SUBSTRATE

BACKGROUND OF THE INVENTION

1. Field of the Invention

The present invention is directed to a fastener for holding and spacing an object at a predetermined distance from a substrate.

2. Description of the Related Art

Several construction-related applications require an object to be spaced from a substrate. For example, before applying stucco to a substrate, it is usually necessary to space a sheet of wire lath from the substrate to reinforce the stucco.

Nails with a cardboard spacer wrapped around the shank of each nail have been used to attach wire lath to a substrate for the purpose of applying stucco to a wall. The cardboard spacer has a thickness that corresponds to the desired space between the wire lath and the substrate so that when the wire lath is clamped between the cardboard spacer and the head of the nail, the lath is spaced from the substrate by the desired distance. However, installation of these nails and spacers is labor intensive and time consuming, requiring each nail to be hammered into the substrate while the installer holds the wire lath between the cardboard spacer and the nail head. Further, it is possible that the wire lath will not be securely fastened between the nail head and the spacer.

U.S. Pat. No. 6,363,679 discloses a similar means for spacing wire lath from a substrate using a screw and a plastic spacer. However, the screw and plastic spacer do not relieve the tedious and time consuming process of installing a plurality of screws in order to secure and space a sheet of wire lath at a distance from a substrate.

Staples have been used for fastening objects to substrates, however, they are generally unable to leave a space between the objects and the substrates. Staples can be driven by staple driving tools, such as the model number 3150-S16 and model number IM200-S16 tools manufactured by Paslode, an Illinois Tool Works company.

What is needed is a fastener for holding and spacing an object from a substrate quickly and securely that overcomes the problems of the prior art.

BRIEF SUMMARY OF THE INVENTION

A novel fastener for holding and spacing an object at a predetermined distance from a substrate is provided having a bridge portion, a first prong extending in a driving direction from the bridge portion, and a second prong spaced from the first prong and extending generally parallel thereto in the driving direction from the bridge portion, wherein the second prong is substantially shorter than the first prong.

A novel strip of fasteners for holding and spacing an object at a predetermined distance from a substrate is also provided having a plurality of fasteners connected together in a side-by-side array, wherein each fastener includes a bridge portion, a first prong extending in a driving direction from the bridge portion, and a second prong spaced from the first prong and extending generally parallel thereto in the driving direction from the bridge portion, wherein the second prong is substantially shorter than the first prong, wherein each one of the first prongs is aligned generally in a first plane and each one of the second prongs is aligned generally in a second plane so as to form the strip of fasteners.

These and other features and advantages are evident from the following description of the present invention, with reference to the accompanying drawings.

BRIEF DESCRIPTION OF THE SEVERAL VIEWS OF THE DRAWINGS

FIG. 7 is a side sectional view showing the progress of the fastener being installed to hold and space the wire lath at the predetermined distance from the substrate.

DETAILED DESCRIPTION OF THE INVENTION

Figure 2:
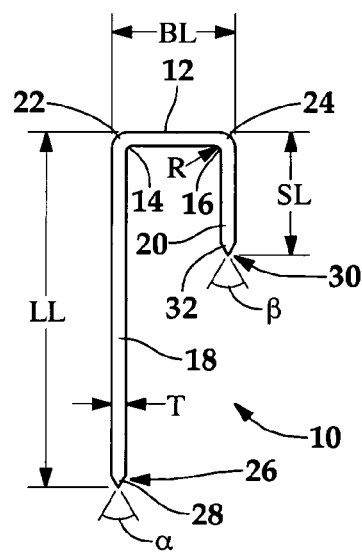
FIG. 2 is a plan view of a fastener for spacing an object from a substrate according to the present invention.
Figure 5:
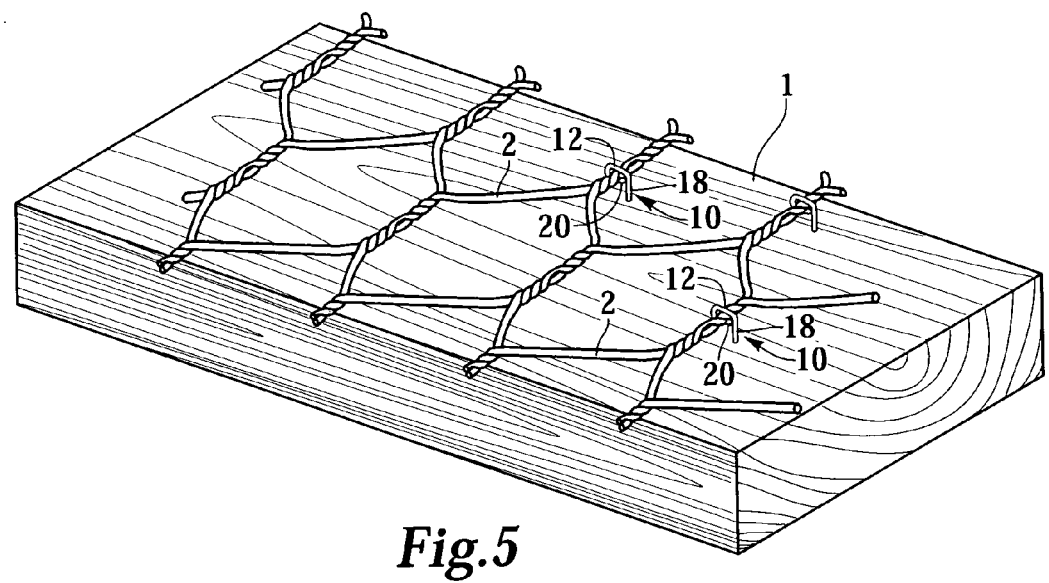
FIG. 5 is a perspective view of the fasteners of the present invention after being installed to hold and space wire lath at a predetermined distance from a substrate.

Referring to FIGS. 2 and 5, a fastener 10 is shown for spacing an object, such as wire lath 2, at a predetermined distance from a substrate 1. In the art, the type of fastener shown and described as element 10 is sometimes called a clip or a staple. Novel fastener 10 includes a bridge portion 12, a long prong 18 extending in a driving direction from bridge portion 12, and a short prong 20 spaced from long prong 18 extending generally parallel to long prong 18 in the driving direction from bridge portion 12, wherein short prong 20 is substantially shorter than long prong 18. Preferably, bridge portion 12, long prong 18, and short prong 20 are all straight-line segments, wherein short prong 20 and long prong 18 are generally perpendicular to bridge portion 12. In one embodiment, the length SL of short prong 20 is between about 75% and about 99% of the length BL of bridge portion 12 and the length SL of short prong 20 is between about 25% and about 45% of the length LL of long prong 18.

Figure 6:
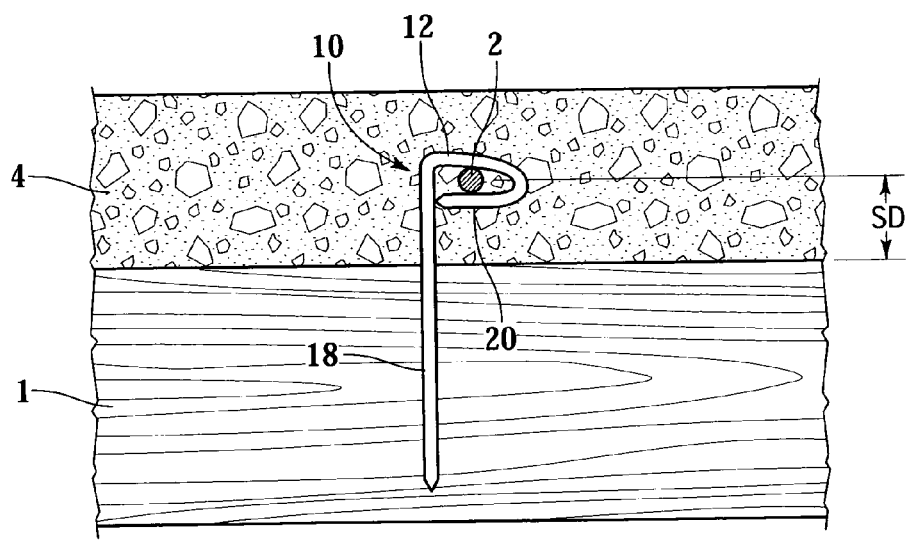
FIG. 6 is a side sectional view of the fastener of the present invention after being installed, including a stucco layer being reinforced by wire lath.

Turning to FIGS. 5 and 6, fastener 10 is used for holding and spacing an object, preferably a wire object, at a predetermined distance SD from a substrate 1. For example, substrate 1 can be wood, plywood, particle board, oriented strand board (OSB board) or other wooden substrates, and fastener 10 can be used to space a sheet of wire lath 2, such as hexagonal or octagonal chicken wire, from substrate 1 before applying one or more layers of plaster or stucco 4 to substrate 1. In this embodiment, wire lath 2 reinforces stucco 4 to prevent it from breaking away from substrate 1 after stucco 4 has been applied.

It is preferred that wire lath 2 be spaced from substrate 1 by a predetermined distance SD so that wire lath 2 will be embedded generally in the middle of stucco 4, as shown in FIG. 6, to most effectively reinforce stucco 4. Fastener 10 fastens wire lath 2 to substrate 1, as described below, so that wire lath 2 is spaced from substrate 1 by predetermined distance SD. In one embodiment, wire lath 2 is spaced from substrate 1 by a predetermined distance SD of between about ⅛ inch and about ⅜ inch, preferably between about ¼ inch and about 5/16 inch.

Clip

Turning back to FIG. 2, fastener 10 is a generally J shaped wire member having a bridge portion 12 with two ends 14, 16, a long prong 18 extending in the driving direction from one end 14 of bridge portion, and a short prong 20 spaced from long prong 18 and extending generally parallel to long prong 18 in the driving direction from the other end 16 of bridge portion 12, wherein the length SL of short prong 20 is substantially shorter than the length LL of long prong 18.

Fastener 10 should be made from a material that is strong enough to securely fasten wire lath 2 to substrate 1 and to support wire lath 2 and stucco 4 under normal conditions to prevent stucco 4 from breaking off substrate 1. Fastener 10 can be made from steel used to make staples for the construction industry. The material of fastener 10 can be carbon steel, stainless steel, or other metals and alloys used to make wire staples. In one embodiment, fastener 10 is made from carbon steel having a carbon content between 1008 carbon steel and 1065 carbon steel, wherein lower carbon content steel, such as 1008 steel, is used for substrates 1 that are soft, such as chip board, and higher carbon content steel, such as 1065 steel, is used for hard substrates 1, such as solid hard woods. Fastener 10 can be made from metal wire that has been shaped. Fastener 10 may be made from carbon steel wire having a gauge between about 18 gauge and about 12 gauge, preferably about 16 gauge or about 14 gauge. In one embodiment, fastener 10 is made from shaped 1018 carbon steel 16 gauge wire. Preferably the wire is flattened so that the wire has a thickness T of about 0.05 inch and a width W of about 1/16 inch. If a thicker clip is desired, 14 gauge steel wire may also be used.

Fastener 10 is driven by a fastener driving tool 6, described below. Bridge portion 12 of fastener 10 is impacted by a driver blade 8 of tool 6 so that fastener 10 is driven into substrate 1, see FIGS. 7A–7D. Bridge portion 12 has a profile that complements the profile of a driving end 9 of driver blade 8 so that fastener 10 is driven straight and evenly into substrate 1. In one embodiment, driving end 9 of driver blade 8 has a generally rectangular profile with a generally planar driving surface (not shown) generally normal to the driving direction. Fastener 10 has an extended, generally straight bridge portion 12, see FIG. 2, that is also generally normal to the driving direction so that the driving surface will contact bridge portion 12 evenly as fastener 10 is driven. Preferably, length BL of bridge portion 12 is approximately the same as the width of driving end 9 of driver blade 8.

Figure 1:
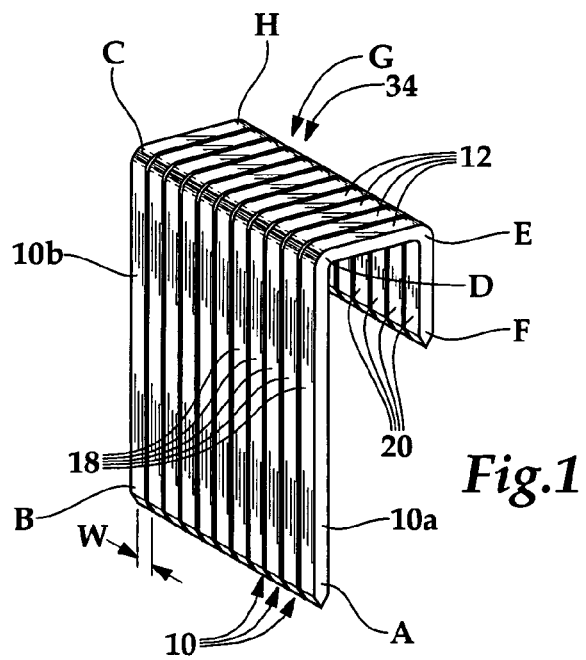
FIG. 1 is a perspective view of a strip of a plurality of fasteners for spacing an object from a substrate according to the present invention.

In one embodiment, bridge portion 12, long prong 18, and short prong 20 are generally straight-line segments wherein prongs 18, 20 are generally perpendicular to bridge portion 12, as shown in FIG. 2. Preferably, bridge portion 12, long prong 18, and short prong 20 are straight-lined segments that are all generally in the same plane, as is best seen in FIG. 1.

Short prong 20 and long prong 18 extend from bridge portion 12 so that they are generally parallel to each other. In the embodiment shown in FIG. 2, short prong 20 extends from one end 16 of bridge portion 12 and long prong 18 extends from the other end 14 of bridge portion 12. Prongs 18, 20 preferably both extend generally in the driving direction of driver blade 8 so that both short prong 20 and long prong 18 are generally parallel to each other and generally perpendicular to bridge portion 12.

Preferably, the juncture 22 between long prong 18 and bridge portion 12 and the juncture 24 between short prong 20 and bridge portion 12 are curved, as shown in FIG. 2, so that there is a smooth transition between bridge portion 12 and prongs 18, 20. Curved junctures 22, 24 are preferred because they minimize the concentration of stress and fault lines at junctures 22, 24 which can cause prongs 18, 20 to break off at the high forces experienced by fastener 10. In one embodiment, junctures 22, 24 have an inside radius of curvature R of about 1/32 inch.

In one embodiment, long prong 18 extends from end 14 of bridge portion 12 to a distal end 26 having a point 28 and short prong 20 extends from the opposite end 16 of bridge portion 12 to a distal end 30 having a point 32. In one embodiment, long prong point 28 forms an angle α and short prong point 32 forms an angle β, wherein the tips of points 28, 32 are generally centered along the thickness of prongs 18, 20. In one embodiment, angles α and β are approximately equal to each other, wherein angles α and β are between about 50° and about 90°, preferably between about 65° and about 75°, still more preferably about 70°.

The length LL of long prong 18 is substantially longer than the length SL of short prong 20 so that when fastener 10 is installed, wire lath 2 will be spaced from substrate 1 by predetermined distance SD. Long prong length LL is selected so that enough of long prong 18 is embedded in substrate 1 to securely fasten fastener 10 and wire lath 2 to substrate white still having enough of long prong 18 protruding from substrate 1 to space wire lath 2 from substrate 1 by predetermined distance SD.

Length SL of short prong 20 is substantially shorter than long prong length LL. It is preferred that short prong length SL be shorter than the length BL of bridge portion 12 so that when short prong 20 is bent during driving, as described below, it is not interfered with by long prong 18, but rather bends enough to securely hold wire lath 2 between short prong 20 and bridge portion 12, as shown in FIGS. 6 and 7D.

In one embodiment, short prong length SL is between about 25% and about 45%, preferably about 35% of long prong length LL and between about 75% and about 99%, preferably about 87% of bridge portion length BL. For the application of holding and spacing wire lath 2 from substrate 1, bridge portion 12 can have a length BL, of between about 1/16 inch and about 1-½ inch, preferably between about 3/16 inch, known as a narrow crown clip, and about 15/16 inch, known as a wide crown clip, still more preferably about ½ inch, known as a standard crown clip, short prong 20 can have a length SL between about 5/32 inch and about 13/16 inch, preferably between about ¼ inch and about ⅝ inch, still more preferably about 7/16 inch, and long prong 18 has a length LL of between about 1 inch and about 2 inch, preferably between about 1-⅛ inch and about 1-½ inch, still more preferably about 1-¼ inch.

Strip of Clips

Turning to FIG. 1, in a preferred embodiment of the present invention, a plurality of clips 10 are arranged in a strip 34 so that a plurality of fasteners 10 can easily be fed to tool 6. Strip 34 includes a plurality of fasteners 10 connected together in a side-by-side array, as shown in FIG. 1, wherein each fastener 10 includes a bridge portion 12, see FIG. 1, a long prong 18 extending in a driving direction from bridge portion 12, and a short prong 20 spaced from long prong 18 and extending generally parallel to long prong 18 in the driving direction from bridge portion 12, wherein short prong 20 is substantially shorter than long prong 18. Each one of the long prongs 18 is aligned generally in a common plane ABCD and each one of the short prongs 20 are aligned generally in a common plane EFGH (see FIGS. 1 and 3) so as to form strip 34 of fasteners 10.

Figure 3:
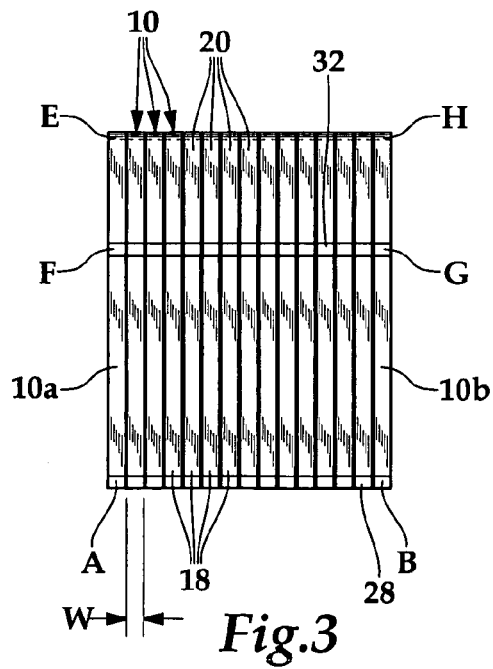
FIG. 3 is a side view of the strip of fasteners according to the present invention.

Preferably, fasteners 10 are releasably connected together so that they do not break apart during normal handling of strip 34 and tool 6, but rather are broken apart when driver blade 8 sheers a first fastener 10 away from the rest of strip 34 and drives the fastener 10 toward substrate 1. Fasteners 10 can be connected together with welding, microwelding, adhesives, and other means of fastening or cohering a plurality of fasteners 10 together in the side-by-side array shown in FIGS. 1 and 3. In one embodiment, fasteners 10 are connected together with an adhesive, each one of the bridge portions 12 are generally straight and each bridge portion 12 is aligned generally in a common plane CDEH, wherein plane CDEH of bridge portions 12 is generally perpendicular to plane ABCD of long prongs 18 and plane EFGH of short prongs 20 so that fasteners 10 of strip 34 are generally aligned with one another. Preferably, long prong 18, short prong 20, and bridge portion 12 of each of the plurality of fasteners 10 are generally straight-line segments that are generally in the same plane, such as plane ADEF shown in FIG. 1, and the planes of each of the fasteners 10 in strip 34 are substantially parallel to each other, such as plane ADEF of fastener 10a being generally parallel to plane BCHG of fastener 10b, as shown in FIGS. 1 and 3.

In one method, strip 34 is manufactured in a multi-wire operation, wherein a plurality of wires (not shown) are pulled at the same time so that the wires are running concurrently. The plurality of wires are pulled together so that they form a sheet of wires, wherein they are connected together by an adhesive material, such as a nitrocellulose adhesive, that adheres adjacent wires together. Examples of adhesives that can be used are described in U.S. Pat. No. 5,441,373, assigned to the assignee of this application, the disclosure of which is incorporated herein by reference. The adhesive is allowed to dry and cool to room temperature before the pre-adhered wire is punched into the shape of strip 34 of fasteners 10. In one method, the wires are round, 16 gauge, 1018 carbon steel that are flattened in a flattening mill before the wires are pulled together so that each wire has a generally rectangular cross section.

Tool

Turning to FIGS. 4 and 7A–7D, fasteners 10 is installed by a fastener driving tool 6 having a housing 36 with a handle 38 depending generally from a trailing end of housing 36 for an operator to hold tool 6. A trigger 40 is mounted to handle 38 for actuating tool 6. A cylinder 42 is located within housing 36, with a piston 44 within cylinder 42. Driver blade 8 is coupled to piston 44 so that when piston 44 is driven in a driving direction through cylinder 42, so is driver blade 8. A nosepiece 46 is coupled to driving end of housing 36, wherein nosepiece 46 includes a channel 48 for guiding driver blade 8 and fastener 10 toward substrate 1.

A power source, such as pneumatic power, gas combustion, or explosive powder is used to drive piston 44 and driver blade 8 in the driving direction toward fastener 10. In one embodiment, tool 6 includes an air connection 50 for connecting to a compressed air source (not shown), which feeds into a chamber 52 in the trailing direction of piston 44. When trigger 40 is pulled by an operator, air pressure is increased in chamber 52, which drives piston 44 toward fastener 10. Tool 6 can also include a buffer 54 generally at the driving end of cylinder 42 to protect piston 44 and tool 6 from damage due to high speed impact.

Preferably, tool 6 includes a magazine 56 for feeding a strip 34 of fasteners 10 into channel 48. Strip 34 is fed into magazine 56 of tool 6 so that a first clip is within channel 48. When tool 6 is fired, the first clip is broken away from an adjacent second clip by driver blade 8 so that the first clip is driven toward substrate 1. Tool 6 can also include a follower (not shown) which biases strip 34 toward channel 48, so that when the first clip is driven, the follower biases the second clip into channel 48.

Figure 4:
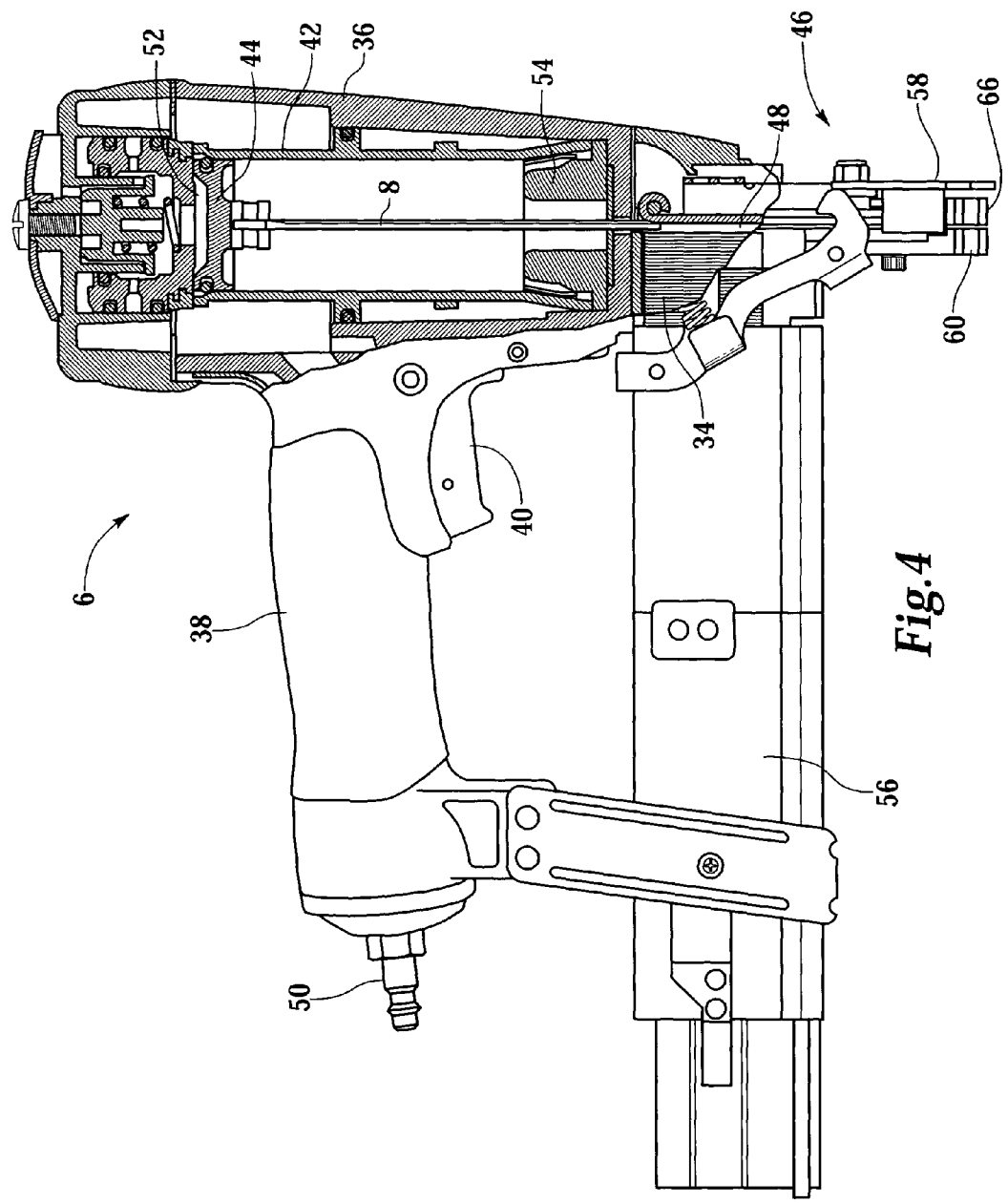
FIG. 4 is a partial side sectional view of a tool for installing the fasteners of the present invention.

Continuing with FIG. 4, tool 6 can also include a drive probe 58 that is operationally connected to a triggering mechanism (not shown), so that tool 6 cannot be fired without drive probe 58 being pushed against substrate 1, forcing drive probe 58 in the trailing direction, enabling actuation of tool 6.

In a preferred embodiment, shown in FIGS. 7A–7D, nosepiece 46 includes a laterally extending slot 60 for receiving and positioning wire lath 2 relative to where fastener 10 will be driven and an anvil 62 with a ramp 64 positioned within channel 48 between slot 60 and a substrate contacting surface 66 for bending short prong 20 inwardly toward long prong 18.

Tool Application Incorporation by Reference

A preferred tool for driving fasteners 10 is disclosed in the commonly assigned, co-pending patent application having Ser. No. 10/658,047, filed contemporaneously herewith, the disclosure of which is incorporated herein by reference.

Method of Installing Clip and Wire Lath

In order to hold and space wire lath 2 at a predetermined distance SD from substrate 1, wire lath 2 is positioned proximate to substrate 1 and tool 6 is positioned so that wire lath 2 will be between prongs 18 and 20 when fastener 10 is driven. In a preferred method, wire lath 2 is positioned within slot 60, as shown in FIG. 7A, which positions wire lath 2 where it can be held between short prong 20 and bridge portion 12.

As fastener 10 is driven by driver blade 8, long prong 18 is driven straight into substrate 1 and acts to securely fasten fastener 10 to substrate 1. Ramp 64 interferes with the path of short prong 20, as shown in FIGS. 7A–7D, so that the force of driver blade 8 forces short prong 20 to be bent by ramp 64. As short prong 20 is directed inwardly toward long prong 18, it holds or grips wire lath 2 between short prong 20 and bridge portion 12 so that wire lath 2 is held by fastener 10.

Ramp 64 is situated within channel so that long prong 18 will not encounter ramp 64, but rather will continue to be driven into substrate 1 by driver blade 8. As short prong 20 is being bent, long prong 18 is driven to a predetermined depth into substrate 1. The depth which fastener 10 is driven into substrate 1 is determined by nosepiece 46. Nosepiece also includes a substrate contacting surface 66 that is pressed against substrate 1 before driving fastener 10. Ramp 64 is spaced from substrate contacting surface 66 by a predetermined distance DN which is approximately equal to the desired spacing distance SD of wire lath 2 from substrate 1. The selected distance DN between nosepiece substrate contacting surface 66 and ramp 64 determines the position where short prong 20 will be bent in relation to substrate 1, which in turn determines where wire lath 2 will be held relative to substrate 1.

While the foregoing written description of the invention enables one of ordinary skill to make and use what is considered presently to be the best mode thereof, those of ordinary skill will understand and appreciate the existence of variations, combinations, and equivalents of the specific exemplary embodiment herein. The invention should therefore not be limited by the above described embodiment, but by all embodiments within the scope and spirit of the invention as claimed.

What is claimed is:

1. A reinforcement system for fastening to a substrate comprising:
   wire lath and a plurality of fasteners;
   wherein each of said fasteners comprises:
      a bridge portion having a length;
      a first prong having a length extending in a driving direction from said bridge portion to a distal end for driving into said substrate;
      and a second prong spaced from said first prong;
      wherein said second prong has a length of between about 25% and about 45% of the length of said first prong and wherein said second prong is bent so as to be generally perpendicular to the first prong and generally parallel to the bridge portion to hold said wire lath between said second prong and said bridge portion at a location wherein the wire lath and second prong are spaced a predetermined distance from said substrate.

2. A fastener according to claim 1, wherein said bridge portion, said first prong and said second prong are generally straight-line segments.

3. A fastener according to claim 2, wherein said first prong and said second prong are generally perpendicular to said bridge portion.

4. A fastener according to claim 1, wherein said fastener is made from a shaped wire.

5. A fastener according to claim 4, wherein said shaped wire has a thickness of about 0.05 inch and a width of about 1/16 inch.

6. A fastener according to claim 1, wherein said fastener is made from shaped 1018 carbon steel wire.

7. A fastener according to claim 1, wherein said fastener is made from shaped wire having a gauge between about 18 and about 12.

8. A reinforcement system for fastening to a substrate comprising:
   wire lath and a plurality of fasteners;
   wherein each of said fasteners comprises:
      a bridge portion having a length;
      a first prong having a length extending in a driving direction from said bridge portion to a distal end for driving into said substrate;
      and a second prong spaced from said first prong;
      wherein said second prong is substantially shorter than said first prong;
      and wherein said second prong has a length of between about 75% and about 99% of the length of said bridge portion and is bent so as to be generally perpendicular to the first prong and generally parallel to the bridge portion to hold said wire lath between said second prong and said bridge portion at a location wherein the wire lath and second prong are spaced a predetermined distance from said substrate.

9. A fastener for holding and spacing an object at a predetermined distance from a substrate comprising:
   a bridge portion;
   a first prong extending in a driving direction from said bridge portion; and
   a second prong spaced from said first prong and extending generally parallel thereto in the driving direction from said bridge portion;
   wherein said bridge portion has a length of about ½ inch, said first prong has a length of about 1-¼ inch and said second prong has a length of about 7/16 inch.

10. A strip of fasteners for holding and spacing an object at a predetermined distance from a substrate, comprising:
    a plurality of fasteners connected together in a side-by-side array, wherein each fastener includes a bridge portion, a first prong having a length extending in a driving direction from said bridge portion, and a second prong spaced from said first prong and extending generally parallel thereto in the driving direction from said bridge portion, wherein said bridge portion has a length of about ½ inch, said first prong has a length of about 1-¼ inch and said second prone has a length of about 7/16 inch;
    wherein each one of said first prongs is aligned generally in a first plane and each one of said second prongs is aligned generally in a second plane so as to form said strip of fasteners.

11. A strip of fasteners according to claim 10, wherein said fasteners are connected together with an adhesive.

12. A strip of fasteners according to claim 11, wherein said third plane is generally perpendicular to said first plane and said second plane.

13. A strip of fasteners according to claim 10, wherein each one of said bridge portions is generally straight and each one of said bridge portions is aligned generally in a third plane.

14. A reinforcement system for fastening to a substrate comprising:
    wire lath and a plurality of fasteners;
    wherein each of said fasteners comprises:
       a bridge portion having a length;
       a first prong having a length extending in a driving direction from said bridge portion to a distal end for driving into said substrate;
       and a second prong having a length spaced from said first prong;
       wherein the length of said second prong is between about 25% and about 45% of the length of said first prong and wherein said second prong is at least about 75% of the length of said bridge portion and said second prong is bent so as to be generally perpendicular to the first prong and generally parallel to the bridge portion to hold said wire lath between said second prong and said bridge portion at a location wherein the wire lath and second prong are spaced a predetermined distance from said substrate.

* * * * *